United States Patent Office 2,768,162
Patented Oct. 23, 1956

2,768,162

QUATERNARY AMMONIUM SALTS OF AMINO-ALKYL CELLULOSE ETHERS

Evan F. Evans, Waynesboro, Va., assignor to Hercules Powder Company, Wilmington, Del., a corporation of Delaware No Drawing. Application November 16, 1951, Serial No. 256,822

16 Claims. (Cl. 260—231)

This invention relates to new cellulose derivatives and, more particularly, to quaternary ammonium salts of aminoalkyl ethers of cellulosic compounds.

In accordance with this invention, it has been found that a quaternary ammonium salt of an aminoalkyl ether of cellulose may be prepared by reacting an aminoalkyl ether of the cellulosic compound with an alkylating or aralkylating agent. These new cellulose derivatives are true quaternary ammonium salts exhibiting many new and unexpected properties. They are soluble in acid, alkali, and water and exhibit these solubilities at a much lower degree of substitution than other amino nitrogen derivatives of cellulose and furthermore exhibit properties not found in other nitrogen-containing cellulose derivatives.

The following examples will illustrate the preparation of these new quaternary ammonium salts in accordance with this invention. All parts and percentages are by weight unless otherwise indicated.

*Example 1*

Seven parts of a finely divided diethylaminoethyl ether of cellulose having a degree of substitution of 0.7 diethyl aminoethyl group per glucose unit was heated under reflux with 57 parts of methyl iodide for 5 hours. After removing the excess methyl iodide by distillation, the residue was thoroughly washed with ether and then was dried in vacuum at 55° C. The 2-(methyldiethylammonium iodide)-ethyl cellulose so prepared amounted to 9.5 parts and on analysis was found to contain 26.3% iodine. It was soluble in water, 5% aqueous sodium hydroxide, and in 20% aqueous acetic acid, whereas the starting diethylaminoethyl cellulose was only partly soluble in water and was insoluble or highly swollen in 5% aqueous sodium hydroxide.

*Example 2*

Seven parts of a finely divided diethylaminoethyl cellulose having a degree of substitution of 0.7 diethylaminoethyl group per glucose unit was heated at 60° C. for 24 hours with 12 parts of n-amyl bromide. The reaction mixture was then cooled and diluted with ether. The solid material was collected and washed thoroughly with ether, after which it was dried in vacuum at 55° C. The 2-(n-amyldiethylammonium bromide)-ethyl cellulose so obtained amounted to 8.4 parts and on analysis was found to contain 19.0% bromine. It was soluble in water, 5% aqueous sodium hydroxide, and 20% aqueous acetic acid, whereas the cellulosic starting material was only partly soluble in water and highly swollen in 5% aqueous sodium hydroxide.

*Example 3*

Seven parts of a finely divided diethylaminoethyl cellulose having a degree of substitution of 0.7 diethylaminoethyl group per glucose unit was heated at 60° C. for 24 hours with 10 parts of cetyl bromide. The reaction mixture was then cooled and diluted with ether. The solid material was collected, washed thoroughly with ether and then dried at 55° C., whereby 9.6 parts of 2-(cetyldiethylammonium bromide)-ethyl cellulose was obtained. On analysis the product was found to contain 13.0% bromine. It was partly soluble in water, 5% aqueous sodium hydroxide and 20% aqueous acetic acid.

*Example 4*

Seven parts of a finely divided diethylaminoethyl cellulose having a degree of substitution of 0.7 diethylaminoethyl group per glucose unit was heated at 60° C. for 24 hours with 11 parts of benzyl chloride. The reaction mixture was then cooled and diluted with ether. The solid material was collected, washed thoroughly with ether and dried at 55° C. in vacuum, whereby 8.5 parts of 2-(benzyldiethylammonium chloride)-ethyl cellulose was obtained. On analysis the product was found to contain 12.0% chlorine. It was soluble in water, 5% aqueous sodium hydroxide, and 20% aqueous acetic acid, whereas the starting cellulosic material was only partly soluble in water and was highly swollen in 5% aqueous sodium hydroxide.

*Example 5*

Example 1 was repeated except that methyl bromide was used in place of methyl iodide, whereby 2-(methyldiethylammonium bromide)-ethyl cellulose was obtained. It was soluble in water and was not precipitated from aqueous solution by the addition of either acid or alkali.

In accordance with this invention, any aminoalkyl ether of a cellulosic compound may be reacted with an alkylating or aralkylating agent and produce the new quaternary ammonium salts of this invention. The aminoalkyl ether of the cellulosic compound used to prepare the new quaternary ammonium salts of this invention may have any degree of substitution of aminoalkyl groups from a few hundredths of one percent up to complete substitution, but, in general, will preferably contain at least about 0.6 aminoalkyl groups per glucose unit. The aminoalkyl group may be a primary, secondary, or tertiary amine as, for example, an aminoalkyl, alkylaminoalkyl, aralkylaminoalkyl, dialkylaminoalkyl, diaralkylaminoalkyl, or alkylaralkylaminoalkyl. Exemplary of the radicals which may be attached to the amino nitrogen of the aminoalkyl ethers of the cellulosic compound which may be used as the starting material to produce the new quaternary salts in accordance with this invention are the alkyl groups such as methyl, ethyl, propyl, butyl, amyl, hexyl, decyl, and lauryl, etc., and aralkyl groups such as benzyl, phenethyl, etc. Thus, the aminoalkyl ether of a cellulosic compound which is used to prepare the new quaternary ammonium salts may be represented by the following formula:

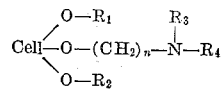

where $R_1$ and $R_2$ may be hydrogen or an aminoalkyl group, $R_3$ and $R_4$ may be hydrogen, alkyl, or aralkyl, and $n$ is an integer of from 2 to 4.

Any alkylating or aralkylating agent may be used for reaction with the aminoalkyl ether of the cellulosic compound to prepare these new quaternary ammonium salts. Such agents are those compounds having the formula $R_5X$ where X is any anion as, for example, a halogen such as bromide, chloride, iodide, or sulfate, sulfonate, phosphate, etc., and $R_5$ is any alkyl or aralkyl radical as, for example, methyl, ethyl, propyl, butyl, amyl, hexyl, decyl, lauryl, cetyl, stearyl, benzyl, phenethyl, etc.

The new quaternary ammonium salts of aminoalkyl ethers of cellulose prepared by the reaction of an alkylating or aralkylating agent with an aminoalkyl ether of a cellulosic compound may be represented by the following formula:

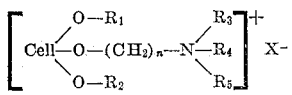

where $R_1$ and $R_2$ may be hydrogen or aminoalkyl, $R_3$, $R_4$, and $R_5$ may be alkyl or aralkyl, $n$ is an integer of from 2 to 4, and X is any anion.

The reaction between the aminoalkyl ether of the cellulosic compound and the alkyl halide or other alkylating or aralkylating agent is readily carried out by heating the two reactants together to a temperature of from about 20° C. to about 100° C., and preferably from about 50° C. to about 80° C. The reaction time may be varied over a wide range and, in general, depends upon the reaction temperature and the type of reactants, longer reaction times usually being preferred when a higher molecular weight aliphatic halide is used as the alkylating agent.

The quantity of alkylating or aralkylating agent used to prepare the quaternary ammonium salt will depend on whether the aminoalkyl ether of the cellulosic compound is a primary, secondary, or tertiary amine. Obviously, more of it would be required to form a quaternary salt from a primary amine than from a tertiary amine. However, the alkylating agent may also be used as the reaction medium, if desired, whereby the handling of the reaction is greatly facilitated. In this case, a large excess of the alkylating agent is used. Instead of an excess of alkylating agent as a reaction medium, an inert organic liquid may be used. Any organic solvent which is inert under the reaction conditions may be employed as, for example, dioxane, benzene, toluene, etc.

The quaternary ammonium salts of the aminoalkyl ethers of the cellulosic compound so obtained may be separated from the reaction mixture in any suitable manner. If the alkylating agent is used as the reaction medium, it may be removed by distillation, or the product may be separated by a washing operation, using as a washing agent an organic solvent in which the product is insoluble but in which the alkylating agent is soluble. Such solvents are diethyl ether, dioxane, tetrahydrofuran, hexane, etc.

The properties of the quaternary salt produced in accordance with this invention will, to a considerable degree, vary with the type of radicals attached to the ammonium nitrogen. For example, those salts containing a long-chain alkyl radical as, for example, a cetyl or stearyl, etc., radical, have a greater solubility in such organic solvents such as benzene, toluene, carbon tetrachloride, etc., than those containing only short-chain radicals as, for example, methyl and ethyl radicals. The latter compounds are, however, more soluble in other solvents such as acetone, ethyl acetate, etc. Consequently, it is possible to select for a particular use a compound having very specific solubilities in organic solvents. This is particularly advantageous in the application of these new products as emulsifying agents.

Another outstanding property which these quaternary ammonium salts of aminoalkyl ethers of cellulose have is their high degree of solubility in acid, alkali, and water even at very low degrees of substitution. For example, at substitutions where a dialkylaminoalkyl cellulose is soluble only in acid and insoluble in water or alkali, the same product when converted to the quaternary ammonium salt is then soluble in all three media. Another difference between these quaternary salts and the parent aminoalkyl cellulose ether is in the number of carbon atoms in the radicals which may be attached to the nitrogen atom and still retain the solubility in acid, alkali, and water. In the case of aminoalkyl ethers of cellulose, the solubility in acid decreases as the length of the alkyl groups attached to the nitrogen increases and hence for acid solubility at a certain degree of substitution, these alkyl radical preferably contain not more than 4 carbon atoms each or a maximum of 8 carbon atoms as the total for the alkyl radicals attached to the tertiary nitrogen. However, with the quaternary ammonium salts of the aminoalkyl ethers of cellulose, as may be seen from the foregoing examples, the solubility characteristics are retained even though the total number of carbon atoms in the radicals attached to the nitrogen atom exceeds 8 and, in fact, these salts are still soluble when the total number of carbon atoms in the radicals attached to the nitrogen amounts to 20.

As has been pointed out above, the new cellulose derivatives of this invention have the distinct advantage over the prior art aminoalkyl ethers of cellulose in that they are soluble in water, dilute alkali, and dilute acid. Thus, they may be used in neutral, basic, and acidic solutions and so are available for a wide variety of applications. Being true quaternary ammonium salts, they may be used as surface-active agents as, for example, in germicides, bactericides, fungicides, and deodorants. They may also be used as stabilizers and as wetting, dispersing, and emulsifying agents in many applications.

What I claim and desire to protect by Letters Patent is:

1. A water-soluble 2-(trialkylammonium halide)-ethyl ether of cellulose containing at least about 0.6 2-(trialkylammonium halide)-ethyl group per glucose unit.

2. A water-soluble 2-(phenalkyldialkylammonium halide)-ethyl ether of cellulose containing at least about 0.6 2-(phenalkyldialkylammonium halide)-ethyl group per glucose unit.

3. A water-soluble 2-(methyldiethylammonium halide)-ethyl ether of cellulose containing at least about 0.6 2-(methyldiethylammonium halide)-ethyl group per glucose unit.

4. A water-soluble 2-(n-amyldiethylammonium halide)-ethyl ether of cellulose containing at least about 0.6 2-(n-amyldiethylammonium halide)-ethyl group per glucose unit.

5. A water-soluble 2-(cetyldiethylammonium halide)-ethyl ether of cellulose containing at least about 0.6 2-(cetyldiethylammonium halide)-ethyl group per glucose unit.

6. A water-soluble 2-(benzyldiethylammonium halide)-ethyl ether of cellulose containing at least about 0.6 2-benzyldiethylammonium halide)-ethyl group per glucose unit.

7. A water-soluble quaternary ammonium salt of an aminoalkyl ether of cellulose containing at least about 0.6 aminoalkyl group per glucose unit and having the formula

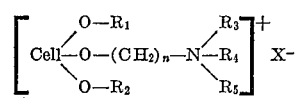

where $R_1$ and $R_2$ are selected from the group consisting of hydrogen and aminoalkyl, $R_3$, $R_4$ and $R_5$ are selected from the group consisting of alkyl and phenalkyl, $n$ is an integer of from 2 to 4, and X is a halide ion.

8. A water-soluble quaternary ammonium salt of an aminoalkyl ether of cellulose containing at least about 0.6 aminoalkyl group per glucose unit and having the formula

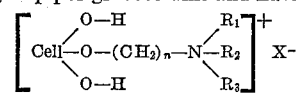

where $R_1$, $R_2$ and $R_3$ are alkyl radicals, $n$ is an integer of from 2 to 4, and X is a halide ion.

9. A water-soluble quaternary ammonium salt of an aminoalkyl ether of cellulose containing at least about 0.6 aminoalkyl group per glucose unit and having the formula

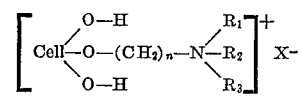

where at least one of $R_1$, $R_2$ and $R_3$ is a penalkyl radical and the others are alkyl radicals, $n$ is an integer of from 2 to 4, and X is a halide ion.

10. The process of preparing a water-soluble quaternary ammonium salt of an aminoalkyl ether of cellulose containing at least about 0.6 aminoalkyl group per glucose unit and having the formula

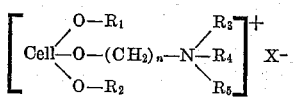

where $R_1$ and $R_2$ are selected from the group consisting of hydrogen and aminoalkyl, $R_3$, $R_4$ and $R_5$ are selected from the group consisting of alkyl and phenalkyl, $n$ is an integer of from 2 to 4, and X is a halide ion, which comprises heating said cellulose ether with, at least the theoretical amount required to convert said aminoalkyl groups to quaternary ammonium alkyl groups, of an alkylating agent selected from the group consisting of alkylating and aralkylating agents to a temperature of from about 20° C. to about 100° C.

11. The process of preparing a water-soluble quaternary ammonium salt of an aminoalkyl ether of cellulose containing at least about 0.6 aminoalkyl group per glucose unit and having the formula

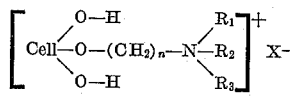

where $R_1$, $R_2$ and $R_3$ are alkyl radicals, $n$ is an integer of from 2 to 4, and X is a halide ion, which comprises heating said cellulose ether with at least the theoretical amount required to convert said aminoalkyl groups to quaternary ammonium alkyl groups of an alkylating agent to a temperature of from about 20° C. to about 100° C.

12. The process of preparing a water-soluble quaternary ammonium salt of an aminoalkyl ether of cellulose containing at least about 0.6 aminoalkyl group per glucose unit and having the formula

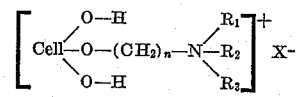

where at least one of $R_1$, $R_2$ and $R_3$ is a phenalkyl radical and the others are alkyl radicals, $n$ is an integer of from 2 to 4, and X is a halide ion, which comprises heating said cellulose ether with at least the theoretical amount required to convert said aminoalkyl groups to quaternary ammonium alkyl groups of an aralkylating agent to a temperature of from about 20° C. to about 100° C.

13. The process of preparing a water-soluble quaternary ammonium salt of an aminoethyl ether of cellulose containing at least about 0.6 aminoethyl group per glucose unit, which comprises heating the aminoethyl ether of cellulose with at least the theoretical amount required to convert said aminoethyl groups to quaternary ammonium alkyl groups of an alkyl halide to a temperature of from about 20° C. to about 100° C.

14. The process of preparing a water-soluble quaternary ammonium salt of an aminoethyl ether of cellulose containing at least about 0.6 aminoethyl group per glucose unit, which comprises heating the aminoethyl ether of cellulose with at least the theoretical amount required to convert said aminoethyl groups to quaternary ammonium alkyl groups of a phenalkyl halide to a temperature of from about 20° C. to about 100° C.

15. The process of preparing a water-soluble quaternary ammonium salt of an aminoethyl ether of cellulose containing at least about 0.6 aminoethyl group per glucose unit, which comprises heating the aminoethyl ether of cellulose with at least the theoretical amount required to convert said aminoethyl groups to quaternary ammonium alkyl groups of an alkyl halide to a temperature of from about 50° C. to about 80° C.

16. The process of preparing a water-soluble quaternary ammonium salt of an aminoethyl ether of cellulose containing at least about 0.6 aminoethyl group per glucose unit, which comprises heating the aminoethyl ether of cellulose with at least the theoretical amount required to convert said aminoethyl groups to quaternary ammonium alkyl groups of a phenalkyl halide to a temperature of from about 50° C. to about 80° C.

References Cited in the file of this patent

UNITED STATES PATENTS

| | | |
|---|---|---|
| 1,777,970 | Hartman | Oct. 7, 1930 |
| 2,120,267 | Schirm | June 14, 1938 |
| 2,291,021 | Bock et al. | July 28, 1942 |
| 2,459,222 | Gurthrie | Jan. 18, 1949 |
| 2,545,492 | Reid et al. | Mar. 20, 1951 |
| 2,656,241 | Drake et al. | Oct. 20, 1953 |

OTHER REFERENCES

Karrer: Organic Chemistry, page 113, Nodeman Publishing Co., New York (1938).

Fieser et al.: Organic Chemistry, page 229, Heath and Co. (1944).